United States Patent
Uragami et al.

(10) Patent No.: US 10,409,063 B2
(45) Date of Patent: Sep. 10, 2019

(54) IMAGE DISPLAY DEVICE

(71) Applicant: Panasonic Intellectual Property Management Co., Ltd., Osaka (JP)

(72) Inventors: Susumu Uragami, Osaka (JP); Hiroyuki Furuya, Osaka (JP); Akira Kurozuka, Osaka (JP); Yuta Yamamoto, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/880,783

(22) Filed: Jan. 26, 2018

(65) Prior Publication Data
US 2018/0239140 A1 Aug. 23, 2018

(30) Foreign Application Priority Data

Feb. 20, 2017 (JP) .................................. 2017-028719

(51) Int. Cl.
 *G02B 27/01* (2006.01)
 *G02B 26/08* (2006.01)
 (Continued)

(52) U.S. Cl.
 CPC ....... *G02B 27/0149* (2013.01); *G02B 26/085* (2013.01); *H04N 9/3129* (2013.01); *H04N 9/3141* (2013.01); *H04N 9/3164* (2013.01); *B60K 37/02* (2013.01); *B60K 2370/155* (2019.05); *B60K 2370/333* (2019.05); *B60K 2370/334* (2019.05); *B60K 2370/81* (2019.05); *G02B 2027/0154* (2013.01)

(58) Field of Classification Search
 CPC .............. G02B 27/0149; G02B 26/085; G02B 2027/0154; H04N 9/3129; H04N 9/3141; H04N 9/3164; B60K 37/02; B60K 2350/1072; B60K 2350/2047; B60K 2350/2052; B60K 2350/941
 USPC ....................................................... 359/200.7
 See application file for complete search history.

(56) References Cited

U.S. PATENT DOCUMENTS 5,900,982 A * 5/1999 Dolgoff ................ H04N 9/3144
 359/619
9,835,859 B2 * 12/2017 Furuya .................. G02B 27/104
(Continued)

FOREIGN PATENT DOCUMENTS

JP 2009-150947 7/2009

*Primary Examiner* — Frank G Font
(74) *Attorney, Agent, or Firm* — McDermott Will & Emery LLP

(57) ABSTRACT

An image display device includes a light source, a screen, a scanning unit, an optical system, a drive unit, a support base, and a fixed base. The screen is irradiated with light from the light source, and an image is thus formed on the screen. The scanning unit scans the light from the light source along multiple scanning lines on the screen. The optical system forms a virtual image using the light from the screen. The drive unit moves the screen in an optical axis direction. The support base supports the drive unit. The fixed base supports the support base via a damper. The support base is supported by the fixed base such that the support base has support rigidity higher in a first direction in which a visual distance of a display image is changed in association with the movement of the screen than in directions other than the first direction.

6 Claims, 14 Drawing Sheets

(51) Int. Cl.
*H04N 9/31* (2006.01)
*B60K 37/02* (2006.01)

(56) References Cited

U.S. PATENT DOCUMENTS

| | | | | |
|---|---|---|---|---|
| 2007/0188022 | A1* | 8/2007 | Itabashi | G02B 27/0093 |
| | | | | 307/9.1 |
| 2009/0160736 | A1 | 6/2009 | Shikita | |
| 2011/0001639 | A1* | 1/2011 | Sasaki | G02B 27/0101 |
| | | | | 340/995.19 |
| 2015/0116806 | A1* | 4/2015 | Mizoguchi | G02B 26/0858 |
| | | | | 359/199.4 |
| 2015/0277115 | A1* | 10/2015 | Inamoto | G02B 3/0056 |
| | | | | 359/619 |
| 2016/0161833 | A1* | 6/2016 | Watanabe | B60K 35/00 |
| | | | | 345/7 |
| 2017/0059861 | A1* | 3/2017 | Furuya | G02B 27/104 |
| 2017/0176744 | A1* | 6/2017 | El-Ghoroury | G02B 27/0101 |
| 2017/0264872 | A1* | 9/2017 | Uragami | G02B 27/0101 |
| 2018/0342046 | A1* | 11/2018 | Tomatsu | G06T 3/60 |

* cited by examiner

IMAGE DISPLAY DEVICE

BACKGROUND

1. Technical Field

The present disclosure relates to an image display device and is suitable for being mounted on, for example, a moving body such as a vehicle.

2. Description of the Related Art

In recent years, an image display device called a head-up display has been developed and has been mounted on a moving body such as a vehicle. In a head-up display mounted on a vehicle, light modulated by image information is projected toward a windshield (windscreen), and the reflected light is radiated to driver's eyes. In this way, the driver can see a virtual image of an image in front of the windshield. For example, a vehicle speed, an outside air temperature, or the like is displayed as a virtual image. Recently, it is also considered to display, as a virtual image, a navigation image and an image to alert the driver to passengers.

In the above head-up display, a laser light source such as a semiconductor laser or the like can be used as a light source to generate a virtual image. In this configuration, laser light scans a screen while being modulated depending on an image signal. The screen diffuses the laser light to broaden a region in which the light is radiated to the driver's eyes. This arrangement prevents the driver's eyes from getting out of the irradiated region even if the driver moves his or her head a little, and the driver thus can see the image (virtual image) well and stably.

Unexamined Japanese Patent Publication No. 2009-150947 discloses a configuration in which a screen is moved in an optical axis direction so as to move the focal position of a virtual image in the forward or backward direction. In this configuration, the screen is moved using a motor, a feed screw, and a rack.

SUMMARY

An image display device according to an aspect of the present disclosure includes a light source, a screen, a scanning unit, an optical system, a drive unit, a support base, and a fixed base. The screen is irradiated with light from the light source, and an image is thus formed on the screen. The scanning unit scans the light from the light source along multiple scanning lines on the screen. The optical system forms a virtual image using the light from the screen. The drive unit moves the screen in an optical axis direction. The support base supports the drive unit. The fixed base supports the support base via a damper. The support base is supported by the fixed base such that the support base has support rigidity higher in a first direction in which a visual distance of a display image is changed in association with the movement of the screen than in directions other than the first direction.

According to the image display device of the present aspect, the support base is supported by the fixed base via the damper; thus, even if vibration is generated due to a high-speed movement of the screen, the vibration is absorbed in the damper before being transmitted to the fixed base. Therefore, the vibration can be smoothly eliminated. Further, since the support rigidity of the support base with respect to the fixed base is increased in the direction in which the visual distance is changed, the displacement of the screen is reduced or prevented, where the displacement of the screen is caused, in association with the vibration, in the direction in which the visual distance is changed. Thus, it is possible to reduce or prevent change in the visual distance of the display image in association with the vibration. As a result, it is possible to reduce or prevent deterioration of visibility of the display image.

As described above, according to the present disclosure, an image display device can be provided in which it is possible to smoothly eliminate vibration generated by a high-speed movement of a screen without deteriorating visibility of a display image.

Effects or meanings of the present disclosure will be further clarified in the following description of the exemplary embodiment. However, the exemplary embodiment described below is merely an example of implementing the present disclosure, and the present disclosure is not at all limited to the examples described in the following exemplary embodiment.

DETAILED DESCRIPTION OF EMBODIMENT

Prior to describing an exemplary embodiment of the present disclosure, a problem in conventional techniques will be briefly described. By drawing a series of images on a screen while changing the position of the screen in the optical axis direction at a high speed, an image extending in the depth direction can be visually recognized by a driver. Thus, it is possible to display an image extending in the depth direction (hereinafter, referred to as a "depth image") such as an arrow indicating a traveling direction of a vehicle, in an overlapping manner on an intersection. In this case, in order to make the driver visually recognize the depth image as a single image, it is necessary to display the image at a frame rate of at least in a range from 50 frames/second to 60 frames/second, and it is thus necessary to move the screen at a high speed in the optical axis direction at a speed of one or three times the frequency of a range from 50 Hz to 60 Hz. If the configuration of Unexamined Japanese Patent Publication No. 2009-150947 is used, it is difficult to move the screen at a high speed as described above.

Further, if the screen is moved at a high speed as described above, there is a possibility that vibration is generated in association with the movement of the screen, and the vibration can generate resonance or the like. Therefore, in the case of displaying a depth image by moving the screen at a high speed as described above, it is necessary to smoothly eliminate the vibration generated by the movement of the screen without deteriorating the visibility of the display image.

In view of the above issues, according to the present disclosure, an image display device can be provided in which it is possible to smoothly eliminate vibration generated by a high-speed movement of a screen without deteriorating visibility of a display image.

An exemplary embodiment of the present disclosure will be described with reference to the accompanying drawings.

For the sake of convenience, X, Y and Z-axes perpendicular to one another are added to respective drawings as appropriate. A present exemplary embodiment is a head-up display for on-vehicle use to which the present disclosure is applied.

Figure 1A:
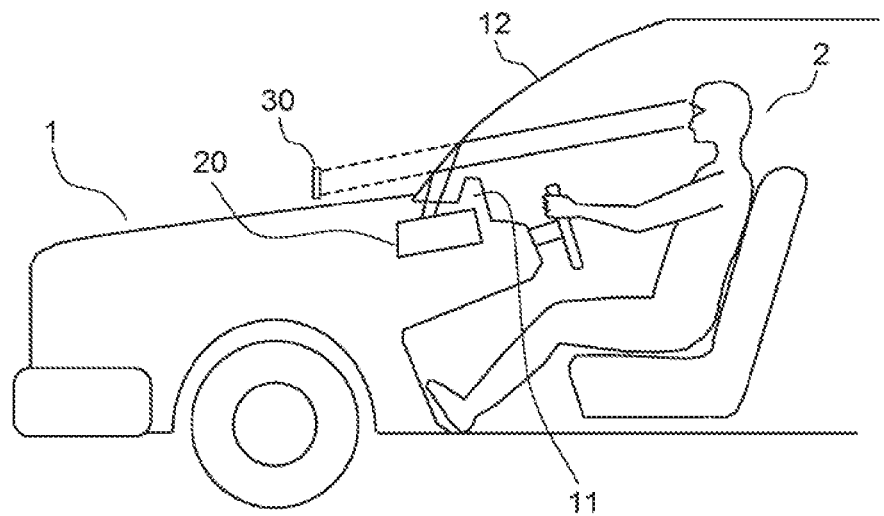
FIG. 1A is a view schematically illustrating a usage form of an image display device according to an exemplary embodiment.
Figure 1B:
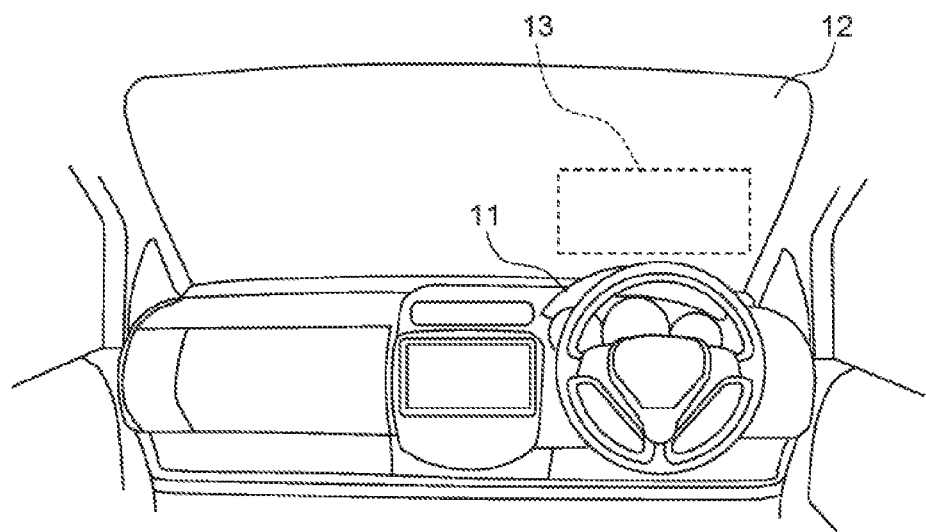
FIG. 1B is a view schematically illustrating a usage form of the image display device according to the exemplary embodiment.

FIGS. 1A and 1B are views each schematically illustrating a usage form of image display device 20. FIG. 1A is a schematic view illustrating, in a see-through manner, an inside of vehicle 1 as viewed from the side of vehicle 1, and FIG. 1B is a view illustrating a front of vehicle 1 in a driving direction as viewed from the inside of vehicle 1.

As shown in FIG. 1A, image display device 20 is installed inside dashboard 11 of vehicle 1.

As shown in FIG. 1A and FIG. 1B, image display device 20 projects laser light, which is modulated by an image signal, onto projection region 13 near a driver's seat on a lower side of windshield 12. The laser light is reflected by projection region 13, and is applied to a laterally long region (eyebox region) in the periphery of a position of driver 2's eyes. In this way, predetermined image 30 is displayed as a virtual image in a viewing field in front of driver 2. Driver 2 can see image 30, which is a virtual image, in an overlapping manner on a scene in front of windshield 12. That is, image display device 20 forms image 30, which is a virtual image, in a space in front of projection region 13 of windshield 12.

Figure 1C:
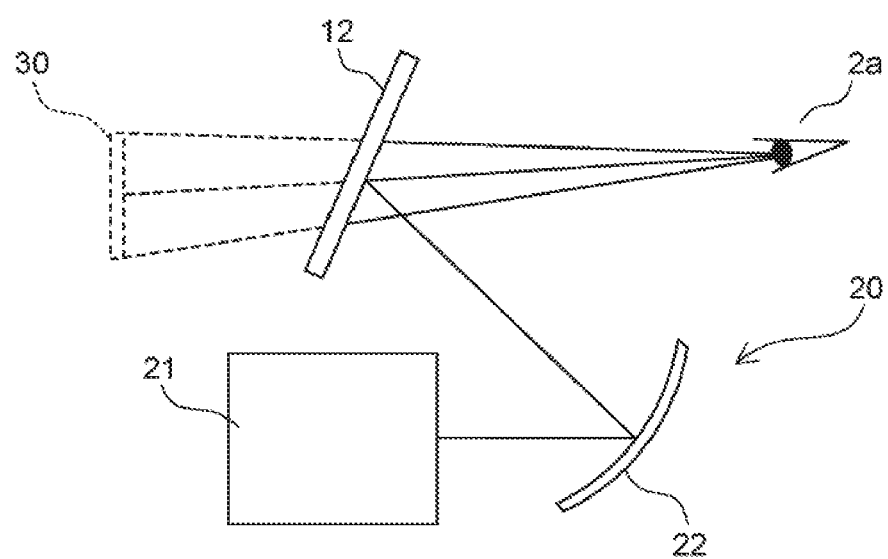
FIG. 1C is a view schematically illustrating a configuration of the image display device according to the exemplary embodiment.

FIG. 1C is a view schematically illustrating a configuration of image display device 20.

Image display device 20 includes irradiation light generator 21 and mirror 22. Irradiation light generator 21 emits laser light modulated by the image signal. Mirror 22 has a curved reflecting surface, and reflects the laser light, which is emitted from irradiation light generator 21, toward windshield 12. The laser light reflected by windshield 12 is radiated to eye 2a of driver 2. An optical system of irradiation light generator 21 and mirror 22 are designed such that image 30 as a virtual image can be displayed in a predetermined size in front of windshield 12.

Figure 2:
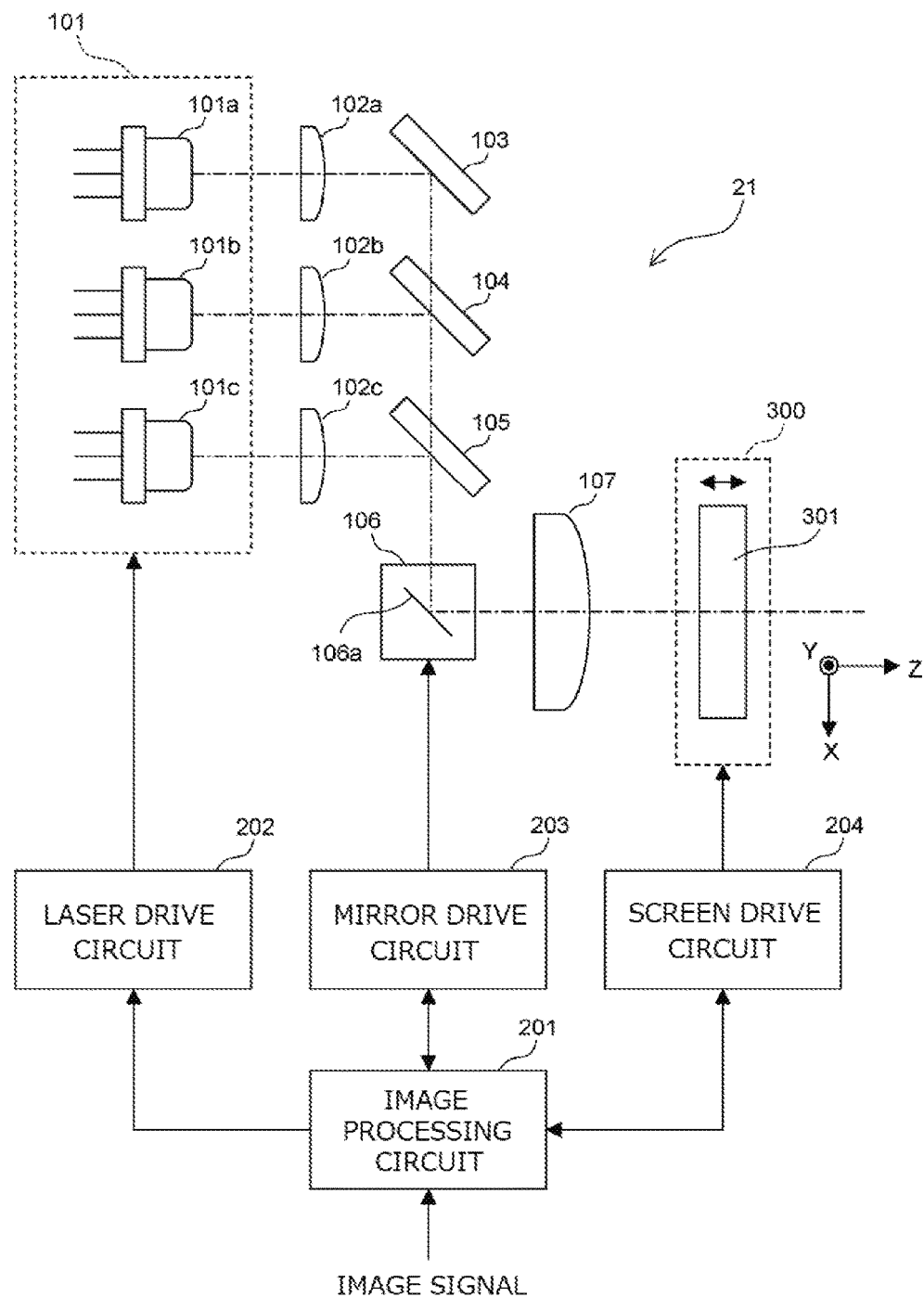
FIG. 2 is a diagram illustrating configurations of an irradiation light generator of the image display device according to the exemplary embodiment and of a circuit for use in the irradiation light generator.

FIG. 2 is a diagram illustrating configurations of irradiation light generator 21 of image display device 20 and a circuit used in irradiation light generator 21.

Irradiation light generator 21 includes light source 101, collimator lenses 102a to 102c, mirror 103, dichroic mirrors 104, 105, scanning unit 106, correction lens 107, screen 301, and drive unit 300.

Light source 101 includes three laser light sources 101a to 101c. Laser light sources 101a to 101c respectively emit laser light in a red wavelength band, a green wavelength band, and a blue wavelength band. In the present exemplary embodiment, in order to display a color image as image 30, light source 101 includes three laser light sources 101a to 101c. If a monochromatic image is displayed as image 30, light source 101 may include only one laser light source corresponding to a color of the image. Laser light sources 101a to 101c are configured with, for example, semiconductor lasers.

Beams of laser light emitted from laser light sources 101a to 101c are respectively converted into parallel light by collimator lenses 102a to 102c. In this arrangement, the laser light emitted from each of laser light sources 101a to 101c is formed in a circular beam shape by an aperture (not shown). Note that, instead of collimator lenses 102a to 102c, shaping lenses may be used, which form the laser light in a circular beam shape on screen 301 and collimate the laser light. In this case, the apertures can be omitted.

Then, with regard to the beams of the laser light of the respective colors emitted from laser light sources 101a to 101c, optical axes of the beams of the laser light are aligned with one another by mirror 103 and two dichroic mirrors 104, 105. Mirror 103 substantially totally reflects the red laser light transmitted through collimator lens 102a. Dichroic mirror 104 reflects the green laser light transmitted through the collimator lens 102b, and transmits therethrough the red laser light reflected by mirror 103. Dichroic mirror 105 reflects the blue laser light transmitted through collimator lens 102c, and transmits therethrough the red laser light and the green laser light, which have passed through dichroic mirror 104. Mirror 103 and two dichroic mirrors 104, 105 are disposed so as to align the optical axes of the beams of the laser light of the respective colors, which are emitted from laser light sources 101a to 101c, with one another.

Scanning unit 106 reflects the beams of the laser light of the respective colors which have passed through dichroic mirror 105. Scanning unit 106 is configured with, for example, a MEMS (Micro Electro Mechanical System) mirror. And scanning unit 106 includes a configuration which rotates mirror 106a around an axis parallel to a Y-axis and an axis perpendicular to the Y-axis in response to a drive signal. The beams of the laser light of the respective colors having passed through dichroic mirror 105 entering to mirror 106a. By rotating mirror 106a as described above, a reflection direction of the laser light changes in an in-plane direction on an X-Z plane and an in-plane direction on a Y-Z plane. In this way, as described later, the screen 301 is scanned by the beams of the laser light of the respective colors.

Note that, although scanning unit 106 is constituted of the MEMS mirror of such a two-axis driving system here, scanning unit 106 may have another configuration. For example, scanning unit 106 may be configured with a combination of a mirror rotationally driven around the axis parallel to the Y-axis and a mirror rotationally driven around the axis perpendicular to the Y-axis.

Correction lens 107 is designed to direct the beams of the laser light of the respective colors in a positive direction of a Z-axis regardless of a swing angle of the laser light deflected by scanning unit 106. Screen 301 is scanned by the laser light to generate an image, and screen 301 diffuses the incident laser light to a region (eyebox region) in the periphery of a position of eye 2a of driver 2. Screen 301 is made of a transparent resin such as polyethylene terephthalate (PET).

Drive unit 300 reciprocally moves screen 301 in a direction (Z-axis direction) parallel to a traveling direction of the laser light. A configuration of drive unit 300 will be described later with reference to FIG. 5A to FIG. 12B.

Image processing circuit 201 includes an arithmetic processing unit such as a CPU (Central Processing Unit) and a memory, processes an image signal, which is input thereto, and controls laser drive circuit 202, mirror drive circuit 203, and screen drive circuit 204. Laser drive circuit 202 changes emission intensities of laser light sources 101a to 101c in response to a control signal from image processing circuit 201. Mirror drive circuit 203 drives mirror 106a of scanning unit 106 in response to a control signal from image processing circuit 201. Screen drive circuit 204 drives screen 301 in response to a control signal from image processing circuit 201. Control in image processing circuit 201 at the time of an image display operation will be described later with reference to FIG. 3B and FIG. 4A.

Figure 3A:
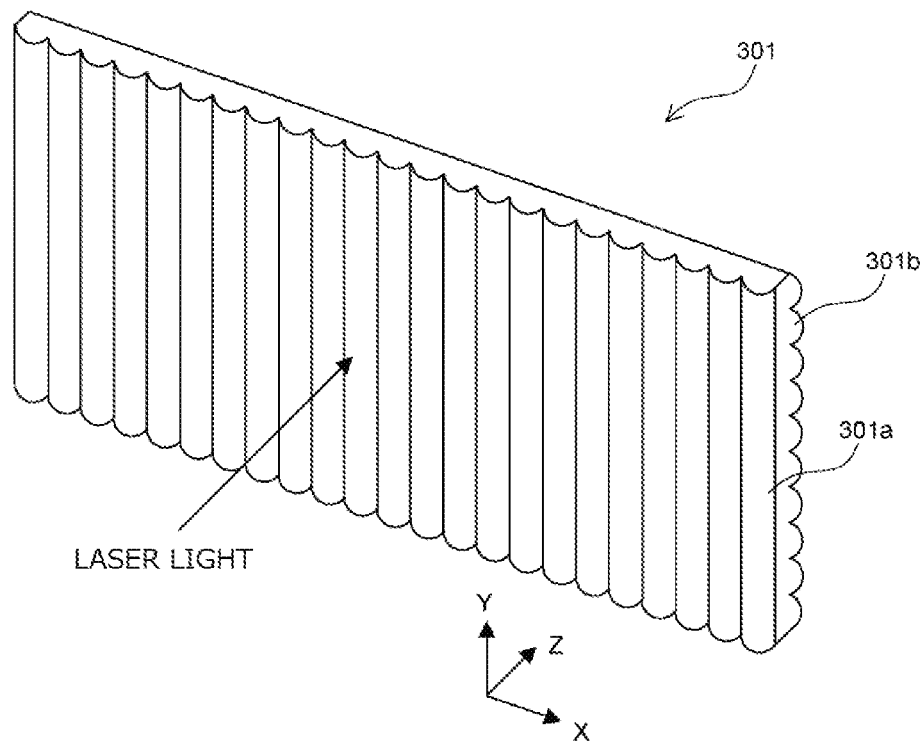
FIG. 3A is a perspective view schematically illustrating a configuration of a screen according to the exemplary embodiment.
Figure 3B:
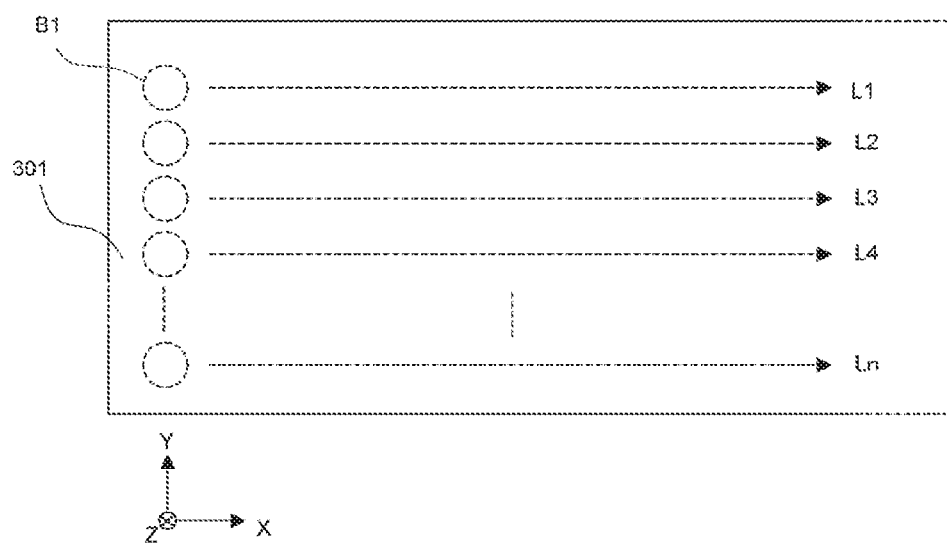
FIG. 3B is a view schematically illustrating a scanning method of laser light with respect to the screen according to the exemplary embodiment.

FIG. 3A is a perspective view schematically illustrating a configuration of screen 301. FIG. 3B is a view schematically illustrating a scanning method of the laser light for screen 301.

As shown in FIG. 3A, a plurality of first lens portions 301a for diverging the laser light in the X-axis direction are formed on a surface on a laser light incident side of screen 301 (that is, a surface on a negative side of the Z-axis) to be arranged in the X-axis direction. A shape of each of first portions parts 301a as viewed from the Y-axis direction is an approximately circular arc shape. A width in the X-axis direction of each of first lens portions 301a is, for example, 50 μm.

Further, a plurality of second lens portions 301b for diverging the laser light in the Y-axis direction are formed on a surface on a laser light emission side of screen 301 (that is, a surface on a positive side of the Z-axis) to be arranged in the Y-axis direction. A shape of each of second lens portions 301b as viewed in the X-axis direction is an approximately circular arc shape. A width in the Y-axis direction of each of second lens portions 301b is, for example, 70 μm.

An incident surface (surface on the negative side of the Z-axis) of screen 301 having the above-described configuration is scanned, as shown in FIG. 3B, in the positive direction of the X-axis by beam B1 in which the beams of the laser light of the respective colors is superimposed on one another. On the incident surface of screen 301, scanning lines L1 to Ln through which beam B1 passes are set beforehand at constant intervals in the Y-axis direction. Start positions of scanning lines L1 to Ln are coincide with one another in the X-axis direction, and the end positions of scanning lines L1 to Ln are coincide with one another in the X-axis direction. The diameter of beam B1 is set to, for example, approximately 50 μm.

The beams of the laser light of the respective colors contained in beam B1 are modulated by the image signal, and beam B1 scans the scanning lines L1 to Ln at a high frequency, thereby forming an image. The image formed in this way is projected onto the region (eyebox) in the periphery of the position of eye 2a of driver 2 via screen 301, mirror 22 and windshield 12 (refer to FIG. 1C). In this way, driver 2 visually recognizes image 30 as a virtual image in a space in front of windshield 12.

Figure 4A:
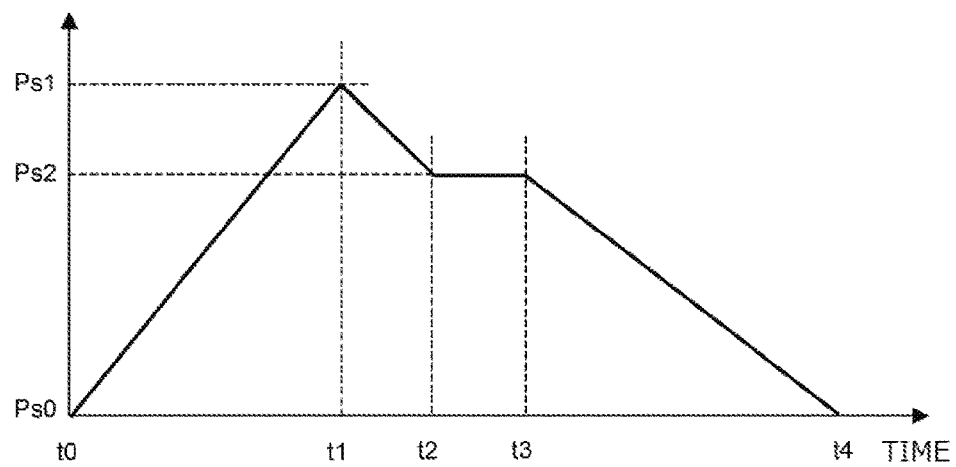
FIG. 4A is a graph showing an example of driving of the screen according to the exemplary embodiment.
Figure 4B:
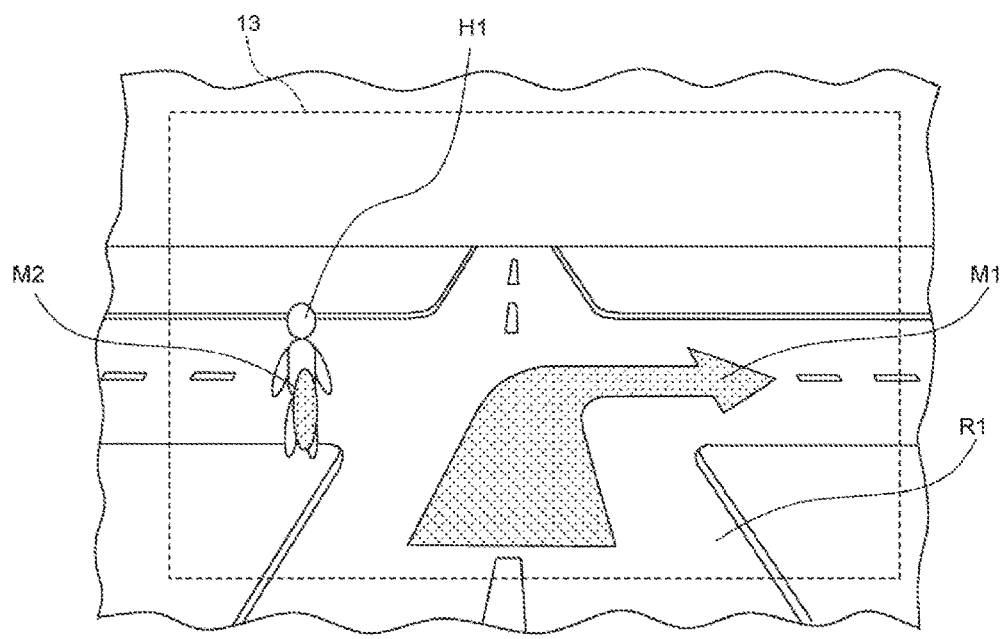
FIG. 4B is a diagram schematically illustrating a display example of an image according to the exemplary embodiment.

FIG. 4A is a graph showing an example of a moving process for screen 301 according to the exemplary embodiment, and FIG. 4B is a diagram illustrating an example of an image displayed by moving screen 301 in image display device 20 according to the exemplary embodiment.

As shown in FIG. 4A, screen 301 is repeatedly moved from time t0 to time t4, which are taken as one cycle. In the period from time t0 to time t1, screen 301 is moved from initial position Ps0 to farthest position Ps1, and in the period from time t1 to time t4, screen 301 is returned from farthest position Ps1 to initial position Ps0. A movement cycle of screen 301, that is, a time period from time t0 to time t4 is, for example, 1/60 seconds.

A time period from time t0 to time t1 is a period for displaying depth image M1 extending in a depth direction in FIG. 4B, and a time period from time t1 to time t4 is a period for displaying vertical image M2 extending in the vertical direction in FIG. 4B. In the example of FIG. 4B, depth image M1 is an arrow for suggesting a direction, in which vehicle 1 should turn on road R1, to driver 2 by a navigation function, and vertical image M2 is a marking for alerting driver 2 to the fact that pedestrian H1 is present. For example, depth image M1 and vertical image M2 are displayed in colors different from each other.

In the period from time t0 to time t1, screen 301 is linearly moved from initial position Ps0 to farthest position Ps1. When screen 301 moves, then in association with this movement, a position at which the virtual image ahead of windshield 12 is formed moves in the depth direction. Therefore, when screen 301 is at each position in the depth direction of depth image M1, laser light sources 101a to 101c are caused to emit light at timing, corresponding to depth image M1, on the scanning lines corresponding to depth image M1, depth image M1 as shown in FIG. 4B can be displayed as a virtual image in front of projection region 13 of windshield 12.

Meanwhile, vertical image M2 does not change in the depth direction but extends only in the vertical direction; thus, it is necessary to generate the virtual image while fixing screen 301 at a position corresponding to vertical image M2. Stop position Ps2 in FIG. 4A is a position of screen 301 and corresponds to the depth position of vertical image M2. During a period of returning from farthest position Ps1 to initial position Ps0, screen 301 is stopped at stop position Ps2 during the period from time t2 to time t3. In this period, laser light sources 101a to 101c on the scanning lines corresponding to vertical image M2 are caused to emit light at timing corresponding to vertical image M2, whereby vertical image M2 as shown in FIG. 4B can be displayed as a virtual image in front of projection region 13 on windshield 12.

The above control is performed by image processing circuit 201 shown in FIG. 2. By this control, in the period from time t0 to time t4, depth image M1 and vertical image M2 are displayed as virtual images. In the above-described control, there occurs a shift between the display timing of depth image M1 and the display timing of vertical image M2; however, since this shift is an extremely short time, driver 2 recognizes an image in which depth image M1 and vertical image M2 are overlapped each other. In this way, in front of projection region 13, driver 2 can see the images (depth image M1, vertical image M2), which are based on the image signal, while causing the images to overlap a scene including road R1 and pedestrian H1.

Note that, in FIG. 4B, since the vertical image M2 is one, stop position Ps2 of screen 301 is set to one in a process of FIG. 4A; however, if there are a plurality of vertical images M2, a plurality of stop positions is set accordingly in the process of FIG. 4A. However, in the process of FIG. 4A, the time period from time t0 to time t4 is constant, and time t4 is unchanged; accordingly, a moving speed (slope of a waveform in FIG. 4A) of screen 301 before and after the stop position is changed in response to an increase and decrease in the number of stop positions.

In the case that screen 301 is scanned by the laser light while being moved in the Z-axis direction, screen 301 is gradually moving in a positive direction of the Z-axis (the direction in which screen 301 gets closer to mirror 22) as the scanning position is moving from scanning line L1 toward scanning line Ln. Therefore, the visual distance of an image part (virtual image) drawn by each of the scanning lines from a viewpoint of driver 2 is changing more ahead (in the depth direction) of the viewpoint of driver 2 as the scanning position is moving from scanning line L1 toward scanning line Ln. That is, under the above-mentioned control, a short-side direction of screen 301 shown in FIGS. 3A and 3B, in other words, the Y-axis direction is the direction (first direction) in which visual distance of the display image is changed along with the movement of screen 301.

By the way, as described above, in order to make driver 2 visually recognize depth image M1 as a single image, it is necessary to reciprocally move screen 301 at a high speed such that the one cycle from time t0 to time t4 in FIG. 4A is, for example, approximately 1/60 seconds. If screen 301 is reciprocally moved at a high speed as described above, there is a possibility that vibration is generated in association with the movement of screen 301 and the vibration is transmitted to a case to generate resonance or the like. Therefore, as described above, in the case of displaying the images (depth image M1, vertical image M2) by moving screen 301 at a high speed, it is necessary to smoothly eliminate the vibration generated by the movement of screen 301 without deteriorating the visibility of these images.

To address this issue, in the present exemplary embodiment, drive unit 300 is provided with a configuration to smoothly eliminate the vibration generated by the movement of screen 301 without deteriorating the visibility of the display image. Hereinafter, a configuration of drive unit 300 will be described with reference to FIG. 5A to FIG. 12B.

Figure 5A:
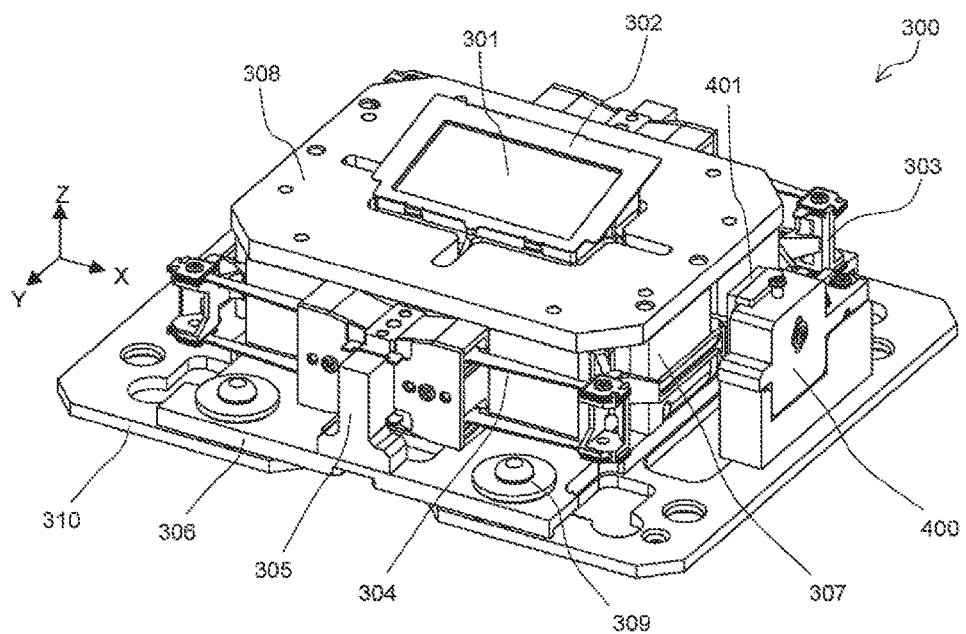
FIG. 5A is a perspective view illustrating a configuration of a drive unit according to the exemplary embodiment.
Figure 5B:
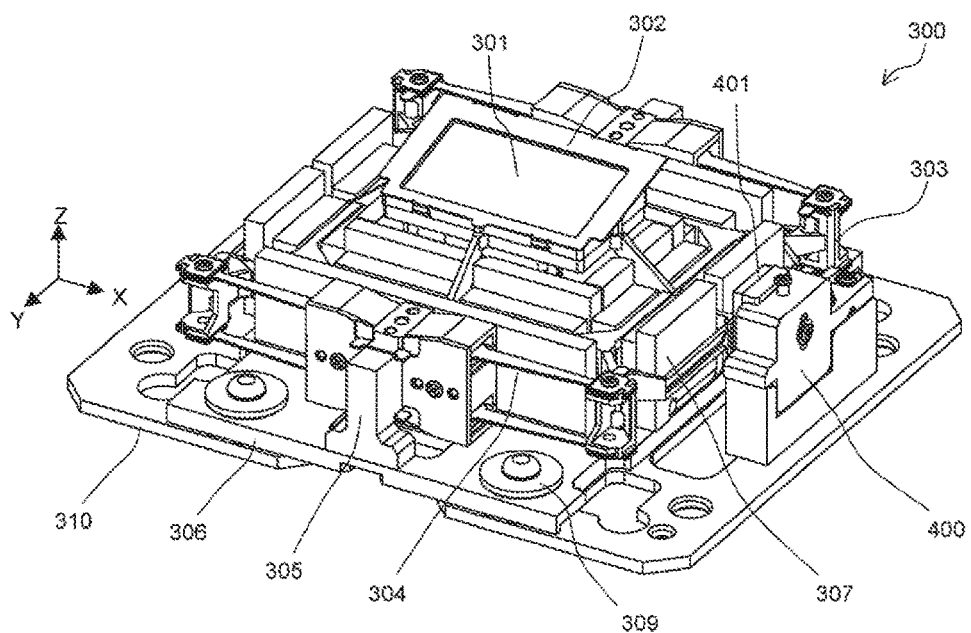
FIG. 5B is a perspective view illustrating the configuration of the drive unit according to the exemplary embodiment when a cover is removed.

FIG. 5A is a perspective view illustrating a configuration of drive unit 300, and FIG. 5B is a perspective view illustrating the configuration of drive unit 300 with cover 308 being detached. FIGS. 5A and 5B show drive unit 300 supported by support base 306 and fixed base 310.

Note that in the following, the configuration will be described, defining directions by X-, Y-, and Z-axes, and in addition, assuming that a side closer to a center of drive unit 300 and a side farther from the center of drive unit 300 in a plan view are respectively referred to as an inside and an outside, for the sake of convenience.

As shown in FIGS. 5A and 5B, screen 301 is placed on support member 303, being held by screen holder 302 in an inclined manner. Support member 303 is supported, movably in the Z-axis direction, on two support units 305 via four suspensions 304. Support units 305 are fixed on support base 306. In this way, screen 301 is supported, movably in the Z-axis direction, on support base 306 via screen holder 302, support member 303, suspensions 304, and support units 305. The configurations of support member 303 and suspensions 304 will be described later with reference to FIGS. 8A and 8B. Further, the configuration of support base 306 will be described later with reference to FIGS. 6A and 6B.

Support base 306 is further provided with magnetic circuit 307. Magnetic circuit 307 applies a magnetic field to coil (not shown in FIG. 5A and FIG. 5B) mounted on support member 303. When a drive signal (current) is applied to the coil, electromagnetic force in the Z-axis direction is excited in the coil, and support member 303 is thus driven together with the coil in the Z-axis direction. This movement moves screen 301 in the Z-axis direction. A configuration of magnetic circuit 307 will be described later with reference to FIGS. 7A and 7B.

Cover 308 is put on an upper surface of magnetic circuit 307. Cover 308 is made of magnetic material and functions as a yoke of magnetic circuit 307. When cover 308 is put on the upper surface of magnetic circuit 307, cover 308 is attracted to magnetic circuit 307. Thus, cover 308 is placed on drive unit 300.

Support base 306 is placed on fixed base 310 via four damper units 309. Damper units 309 support support base 306 while keeping support base 306 in suspension in the positive direction of the Z-axis with respect to fixed base 310. Damper units 309 absorb the vibration generated in association with the driving of support member 303 before the vibration is transmitted from support base 306 to fixed base 310. The configurations of damper units 309 and fixed base 310 will be described later with reference to FIG. 9.

On fixed base 310, position detection unit 400 is further placed. Position detection unit 400 is equipped with encoder 401 facing a side surface, on a positive side of the X-axis, of support member 303, and encoder 401 detects a position of support member 303 in the Z-axis direction. A method for detecting the position of support member 303 with encoder 401 will be described later with reference to FIG. 8B.

Figure 6A:
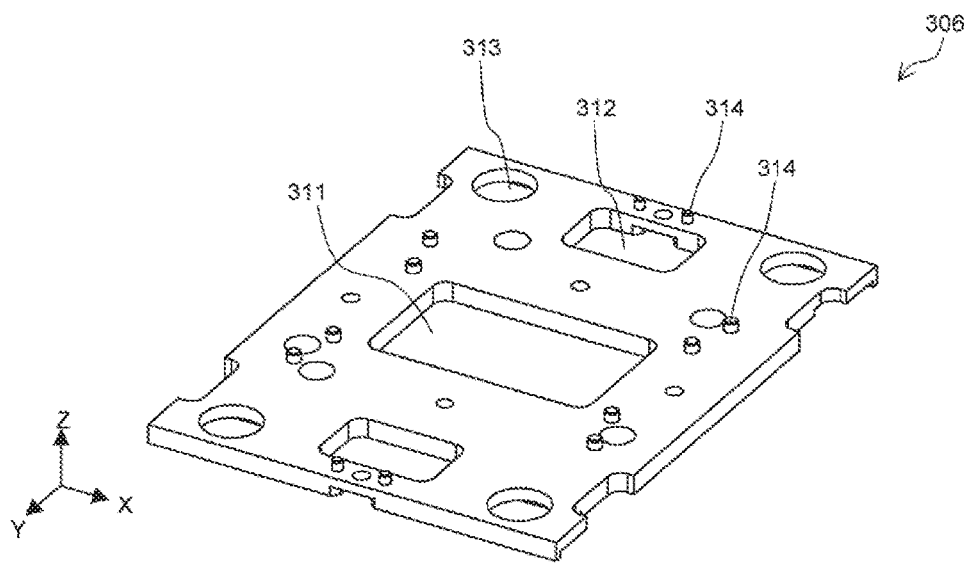
FIG. 6A is a perspective view illustrating a configuration of a support base according to the exemplary embodiment.
Figure 6B:
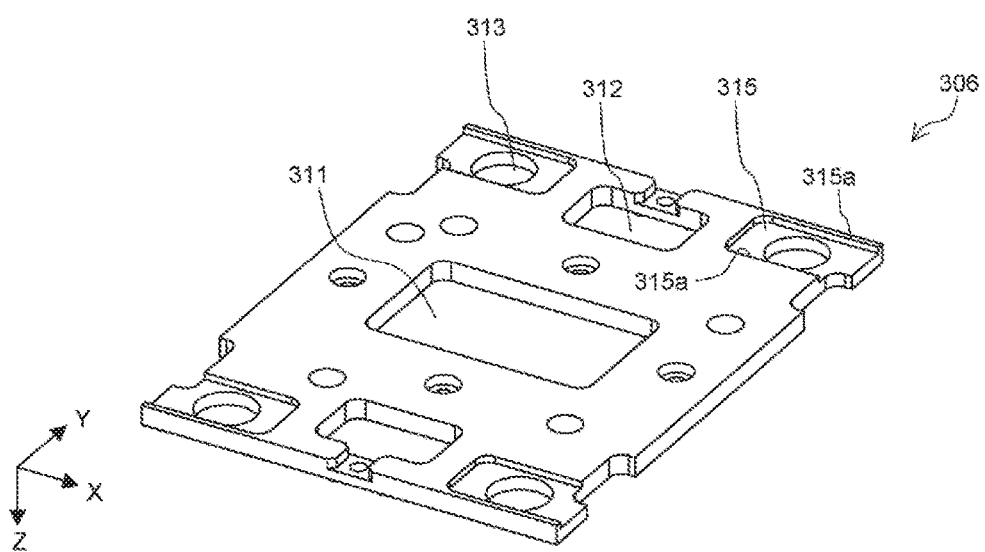
FIG. 6B is a perspective view illustrating the configuration of the support base according to the exemplary embodiment.

FIG. 6A and FIG. 6B are respectively perspective views illustrating a configuration of support base 306 as viewed from the positive side of the Z-axis and the negative side of the Z-axis.

As shown in FIG. 6A, support base 306 has an approximately rectangular shape in a plan view. Support base 306 is made of highly rigid metal material. Opening 311 is formed at a center of support base 306 to let laser light pass through. In addition, on each of four corners of support base 306, there is formed circular hole 313 in which each of damper units 309 is placed.

Further, at a central position in the X-axis direction in each of an end part on a positive side of the Y-axis and an end part of on a negative side of the Y-axis of support base 306, there is formed opening 312 in which support unit 305 is to be placed. In addition, on an upper surface (a surface on the positive side of the Z-axis) of support base 306, there is formed a plurality of bosses 314 to position magnetic circuit 307 and support units 305.

As shown in FIG. 6B, on each of four corners of a lower surface (a surface on a negative side of the Z-axis) of support base 306, there is formed a recessed portion 315 having a uniform depth. Each of recessed portions 315 has a narrower width in the Y-axis direction than in the X-axis direction. Each of holes 313 is positioned at an approximately central position of each of recessed portions 315. Recessed portions 315 each has a pair of walls 315a facing each other in the Y-axis direction. Each of the pairs of walls 315a extends in parallel in the X-axis direction. A distance between the pair of walls 315a is slightly wider than a width of hole 313 in the Y-axis direction.

Figure 7A:
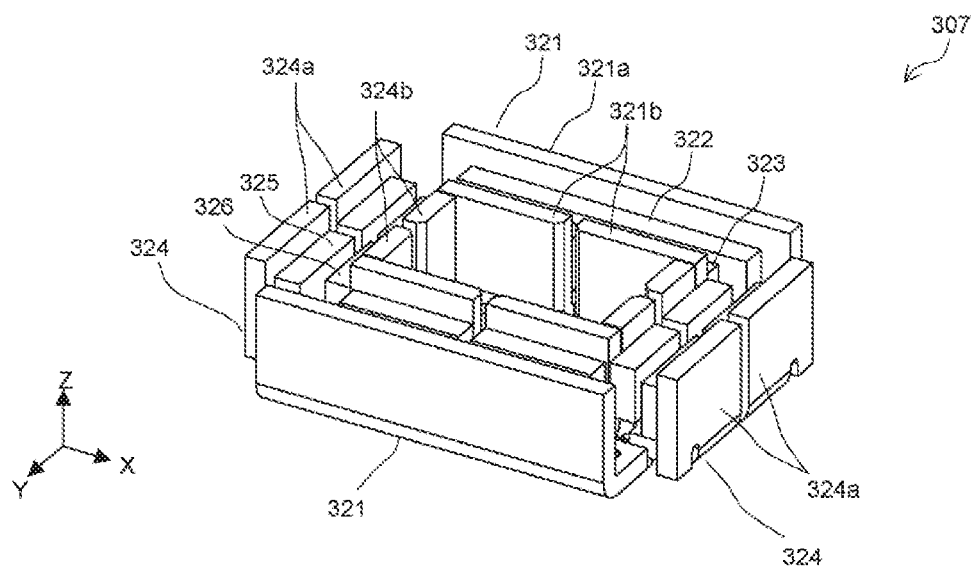
FIG. 7A is a perspective view illustrating a configuration of a magnetic circuit according to the exemplary embodiment.
Figure 7B:
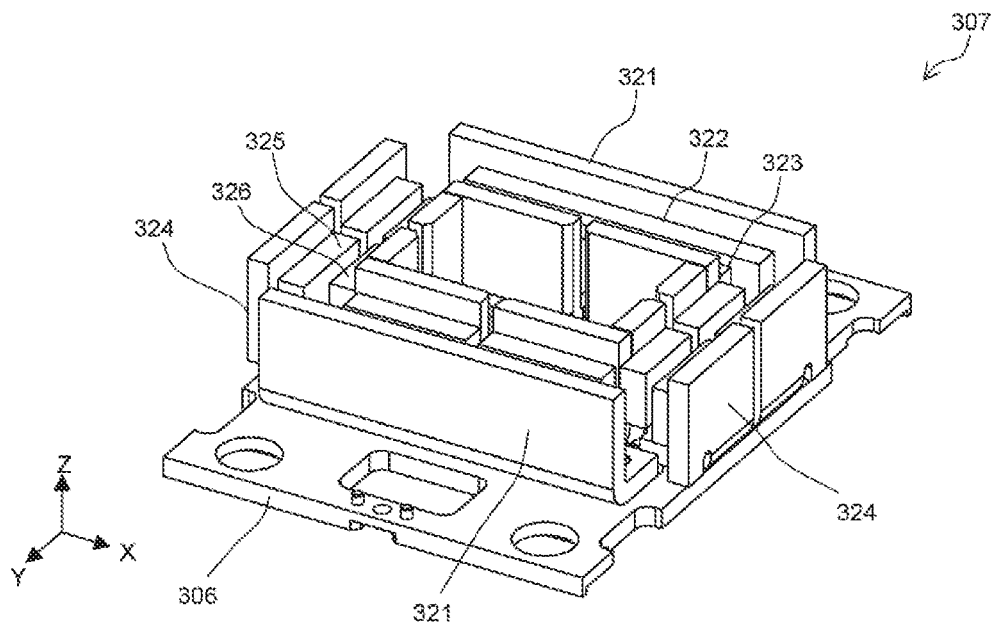
FIG. 7B is a perspective view illustrating the configuration of the magnetic circuit according to the exemplary embodiment.

FIGS. 7A and 7B are perspective views each showing a configuration of magnetic circuit 307.

Magnetic circuit 307 is equipped with two yokes 321 arranged in the Y-axis direction. Yokes 321 have a U-shape when viewed from the X-axis direction. Inner walls 321b of each of two yokes 321 are separated in two pieces. On an inside of outer wall 321a on an outside of each of yokes 321, there is placed magnet 322. Further, on an outside of each of two walls 321b on an inside of each of yokes 321, there is placed magnet 323 to face magnet 322. Between magnet 322 and magnet 323 facing each other, there is a gap in which a coil to be described later is inserted.

Magnetic circuit 307 is further equipped with two yokes 324 arranged in the X-axis direction. Yokes 324 have a U-shape when viewed from the Y-axis direction. Outer wall 324a of each of two yokes 324 is separated in two pieces, and inside wall 324b of each of two yokes 324 is also separated in two pieces. On an inside of each of two walls 324a on the outside of each of yokes 324, there is placed magnet 325. Further, on an outside of each of two walls 324b on an inside of each of yokes 324, there is placed magnet 326 to face magnet 325. Between magnet 325 and magnet 326 facing each other, there is a gap in which a coil to be described later is inserted. An end of magnets 326 in the Y-axis direction overlaps a side surface of inside wall 321b adjacent yokes 321.

In each of lower surfaces of two yokes 321 and each of lower surfaces of two yokes 324, there are holes (not shown) formed at positions at which bosses 314 of support base 306 shown in FIG. 6A are fit in. Yokes 321, 324 are placed on an upper surface of support base 306 such that bosses 314 are fit in the holes formed in the lower surfaces of yokes 321, 324. With this arrangement, as shown in FIG. 7B, magnetic circuit 307 is placed on the upper surface of support base 306.

Figure 8A:
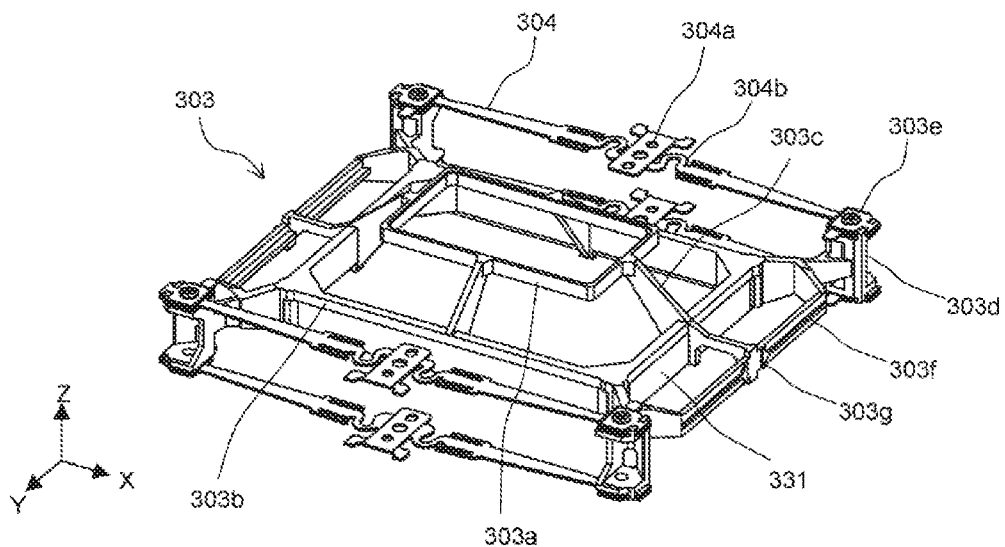
FIG. 8A is a perspective view illustrating a configuration of a support member and a suspension according to the exemplary embodiment when the support member and the suspension are assembled.
Figure 8B:
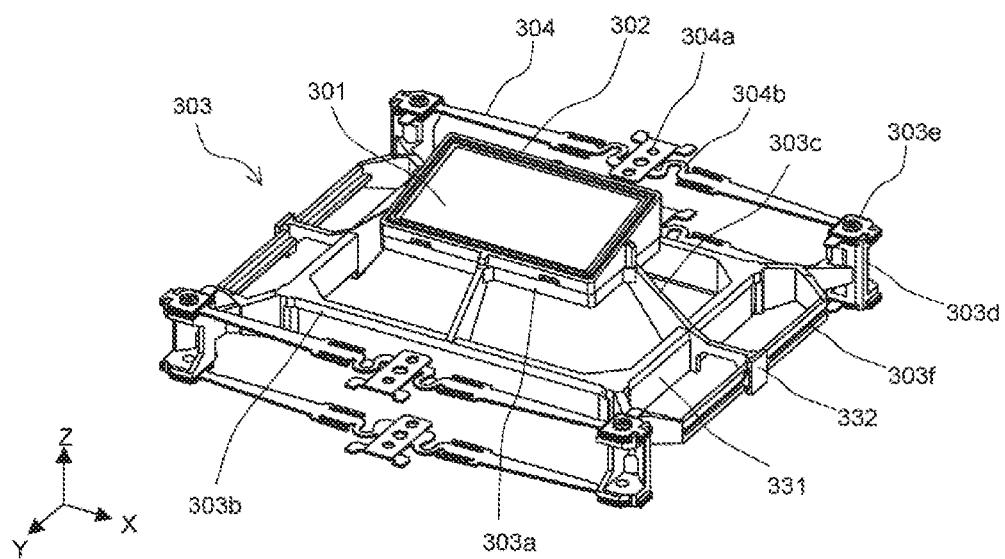
FIG. 8B is a perspective view illustrating a configuration in which a screen and a screen holder are further mounted on the configuration of FIG. 8A.

FIG. 8A is a perspective view illustrating a configuration of the support member 303 and the suspension 304 when the support member 303 and the suspension 304 are assembled. FIG. 8B is a perspective view illustrating a configuration in which screen 301 and screen holder 302 are further mounted on the configuration of FIG. 8A.

As shown in FIG. 8A, support member 303 has a frame shape. Support member 303 is made of non-magnetic material such as resin. Support member 303 is equipped with inner frame 303a and outer frame 303b both in an approximately rectangular shape in a plan view. Inner frame 303a and outer frame 303b are connected to each other with four beams 303c such that a center of inner frame 303a and a center of outer frame 303b are coincide in a plan view. Inner frame 303a is positioned above (in the positive direction of the Z-axis) outer frame 303b.

Screen holder 302 is placed on an upper surface of inner frame 303a. In addition, coil 331 is mounted on a lower surface of outer frame 303b Coil 331 has a shape in which four corners of a rectangle are rounded and which is along with the lower surface of outer frame 303b in a plan view.

Connection members 303d are each formed to extend from each of four corners of outer frame 303b in a radial fashion. Each of these connection members 303d has a flange on each of an upper end and a lower end. On an upper surface of the flange on the upper side of each of connection members 303d, an end of upper suspension 304 is fixed with fixing member 303e. Further, on a lower surface of the flange on the lower side of each of connection members 303d, an end of lower suspension 304 is fixed with fixing member 303e. In this manner, suspensions 304 are mounted on support member 303.

Suspensions 304 are thin plate-shaped members and are each integrally formed of flexible metal material. Suspensions 304 each have a symmetrical shape with respect to a central position in the X-axis direction. Suspensions 304 each have three holes 304a, at a central position in the X-axis direction, for mounting suspension 304 on support unit 305. Further, suspensions 304 each have elastic crank-shaped elastic structures 304b respectively on both sides of holes 304a.

Further, support member 303 is equipped with bridges 303f each connecting connection members 303d which are neighboring to each other in the Y-axis direction. A part of each bridge 303f except both ends in the Y-axis direction extends parallel to the Y-axis direction, and at a center of the part, there is provided mounting surface 303g parallel to a Y-Z plane.

As shown in FIG. 8B, screen holder 302 supporting screen 301 is mounted on the upper surface of inner frame 303a of support member 303. Further, scale 332 is placed on mounting surface 303g of bridge 303f, on the positive side of the X-axis, of support member 303. In this state, two suspensions 304 on the positive side of the Y-axis and two suspensions 304 on the negative side of the Y-axis are attached to support units 305 as shown in FIG. 5B. In this step, coil 331 mounted on the lower surface of outer frame 303b is inserted in a gap between the mutually facing magnets of magnetic circuit 307 shown in FIG. 7B. Further, scale 332 mounted on mounting surface 303g of bridge 303f, on the positive side of the X-axis, of support member 303 faces encoder 401 of position detection unit 400.

Note that regarding magnets 322, 323, 325, 326 of magnetic circuit 307, magnetic poles are adjusted so that a drive signal (current) applied to coil 331 generates driving force (electromagnetic force) in a single direction parallel to the Z-axis direction.

Encoder 401 of position detection unit 400 is equipped with an optical sensor which radiates light to scale 332 and receives light reflected from scale 332, and the optical sensor optically detects movement of scale 332 in the Z-axis direction. On the basis of a detected signal from encoder 401, a position of support member 303 and screen 301 in the Z-axis direction is detected. On the basis of the detected position, driving of drive screen 301 is controlled.

Figure 9:
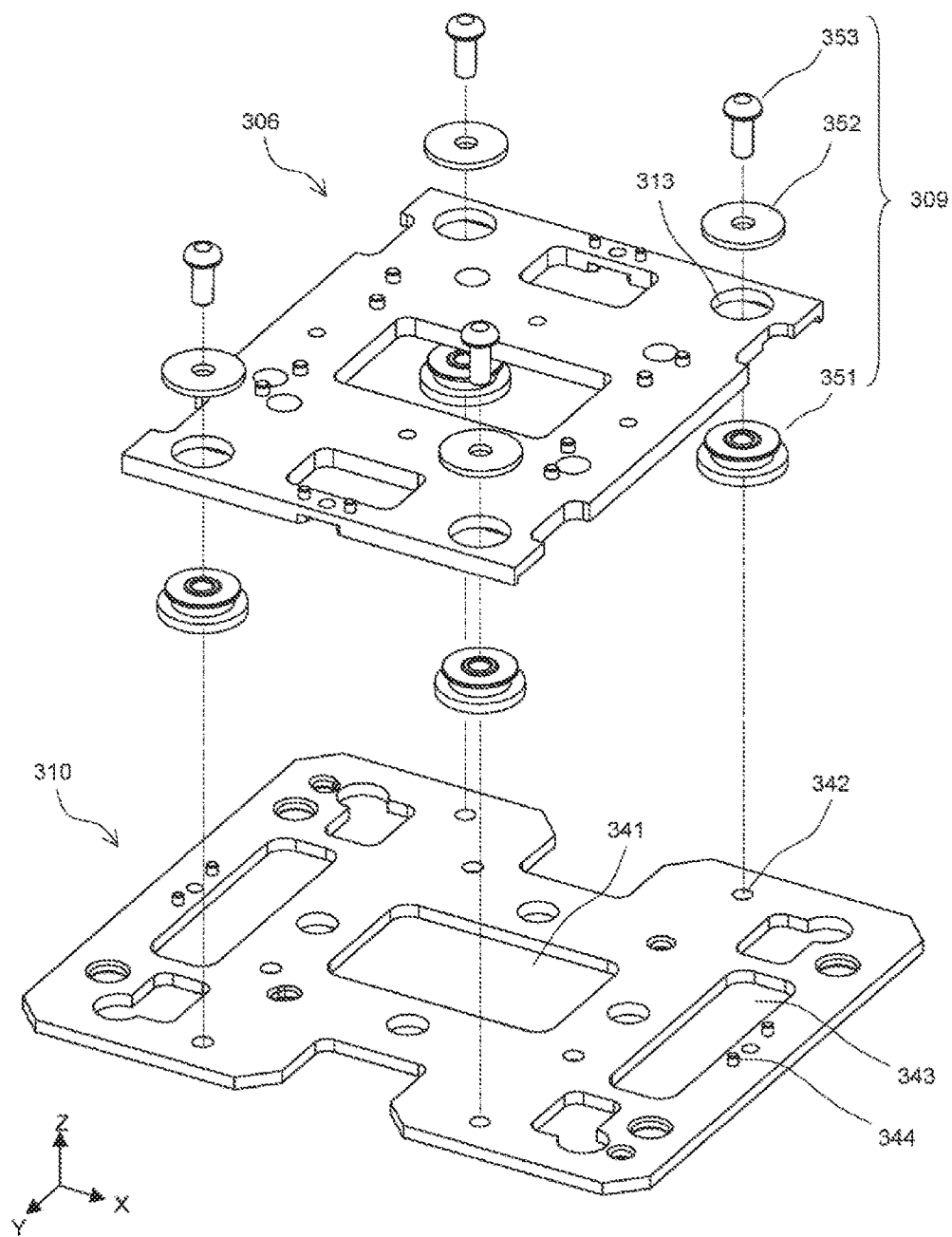
FIG. 9 is an exploded perspective view illustrating an assembly step of the support base and the fixed base according to the exemplary embodiment.

FIG. 9 is an exploded perspective view illustrating an assembly step of the support base 306 and the fixed base 310.

As shown in FIG. 9, each of damper units 309 is equipped with damper 351, washer 352, and bolt 353. Fixed base 310 is equipped with: opening 341 through which laser light passes; bolt holes 342 in which bolts 353 are screwed; opening 343 in which position detection unit 400 is placed; bosses 344 with which position detection unit 400 is positioned. Fixed base 310 is integrally formed of highly rigid metal material.

Dampers 351 are integrally formed of material excellent in damping property. Dampers 351 are made of, for example, material with high viscous damping such as αGEL (registered trade mark) or rubber. As described later, a sleeve in a cylindrical shape is fit in a hole formed at a center of each of dampers 351. Each of dampers 351 is fit in hole 313 formed at each of four corners of support base 306. In this state, washers 352 are put on the upper surfaces of dampers 351. Further, bolts 353 are inserted into washers 352 and screwed in bolt holes 342 of fixed base 310. By this step, support base 306 becomes to be supported by fixed base 310 via dampers 351.

Figure 10A:
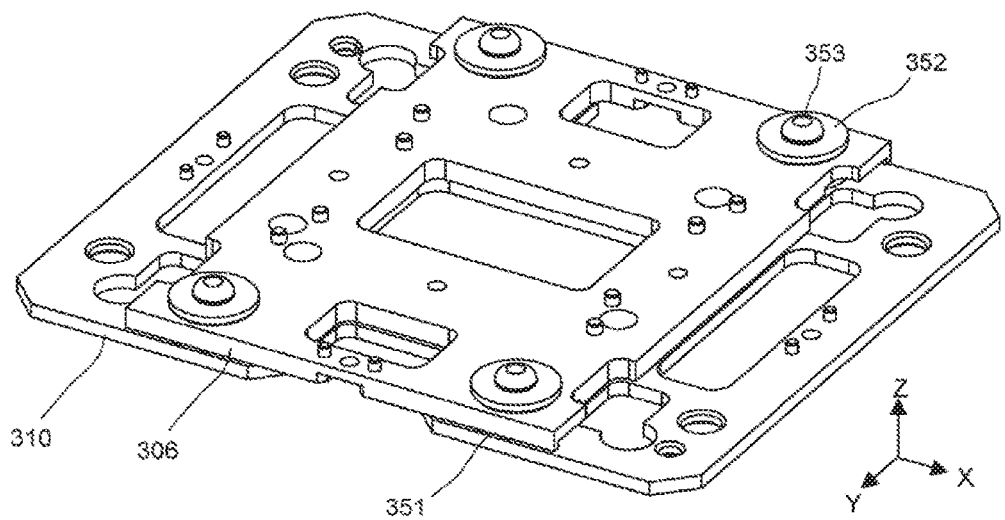
FIG. 10A is a perspective view illustrating a state in which the support base is assembled on the fixed base, according to the exemplary embodiment.

FIG. 10A is a perspective view illustrating a state in which support base 306 is assembled on the fixed base 310.

On support base 306, two support units 305 are placed as shown in FIG. 5B, and to these support units 305 is attached drive unit 300 including screen 301, screen holder 302, support member 303, and suspensions 304. Further, on fixed base 310 is placed position detection unit 400.

Figure 10B:
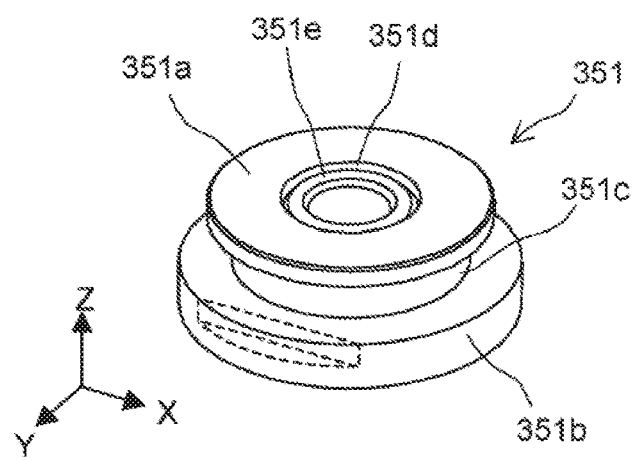
FIG. 10B is a perspective view illustrating a configuration of the damper according to the exemplary embodiment.
Figure 10C:
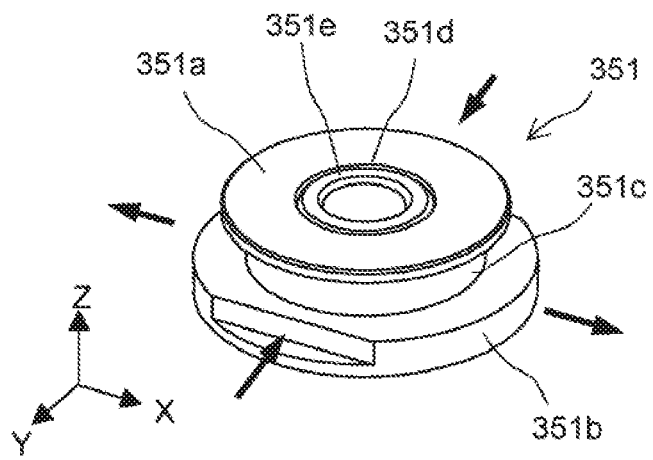
FIG. 10C is a perspective view schematically illustrating the damper according to the exemplary embodiment in a compressed state when the support base is mounted on the fixed base.
Figure 10D:
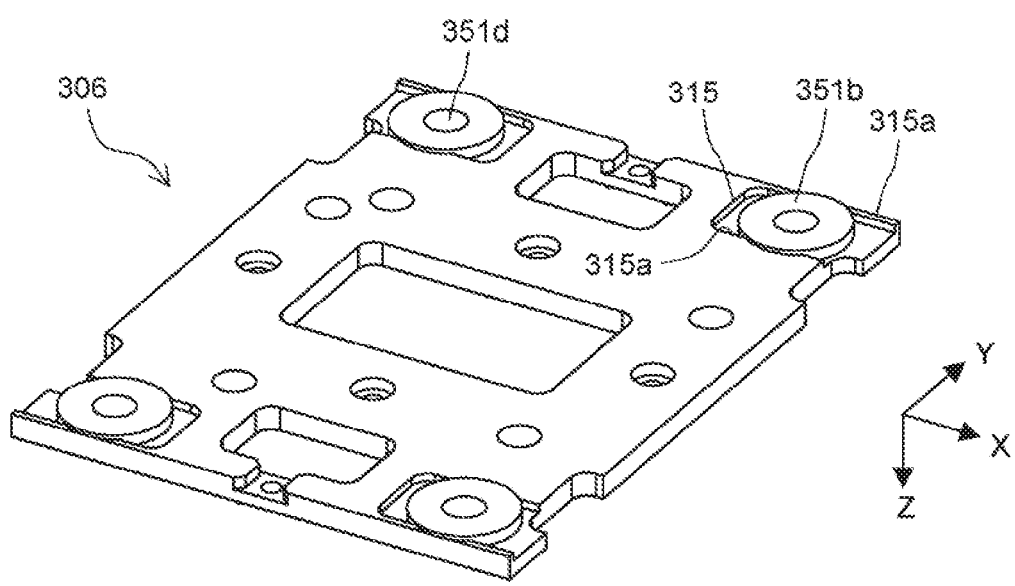
FIG. 10D is a perspective view, as viewed from the back side of the support base, illustrating the damper according to the exemplary embodiment when the support base is mounted on the fixed base.

FIG. 10B is a perspective view illustrating a configuration of damper 351, and FIG. 10C is a perspective view schematically illustrating damper 351 in a compressed state when the support base 306 is mounted on the fixed base 310. Further, FIG. 10D is a perspective view, as viewed from the back side of support base 306, illustrating damper 351 when the support base 306 is mounted on the fixed base 310.

As shown in FIG. 10B, damper 351 has: upper flange 351a and lower flange 351b both in a circular shape in a plan view; and cylinder-shaped body part 351c concentrically connecting upper flange 351a and lower flange 351b. A thickness of lower flange 351b in the Z-axis direction is a few times thicker than a thickness of upper flange 351a in the Z-axis direction. Further, an outer diameter of lower flange 351b is larger than an outer diameter of upper flange 351a. That is, a volume of lower flange 351b is quite larger than a volume of upper flange 351a.

In damper 351, circular hole 351d vertically (in the Z-axis direction) penetrating through a center of damper 351 is formed. In hole 351d, there cylinder-shaped sleeve 351e made of metal material is fit. A thickness of cylinder-shaped sleeve 351e in the vertical direction is slightly thinner than a thickness of hole 351d in the vertical direction.

Dampers 351 are attached respectively to four corners of support base 306 such that upper flange 351a is disposed on an upper surface side of support base 306, lower flange 351b is disposed on a lower surface side of support base 306, and body part 351c is fit in hole 313. After that, bolts 353 are screwed in fixed base 310 via washers 352 so that support base 306 is attached to fixed base 310 as shown in FIG. 10A.

In a state of FIG. 10A, dampers 351 are screwed on fixed base 310 at height positions at which washers 352 are restricted by cylinder-shaped sleeves 351e. With this arrangement, dampers 351 are slightly compressed in the Z-axis direction. In this state, lower flanges 351b are pressed into a space between two walls 315a of respective recessed portions 315 as shown in FIG. 10D such that end parts, of lower flanges 351b, on the positive side of the Y-axis and end parts, of lower flanges 351b, on the negative side of the Y-axis extend to the outside of recessed portions 315 shown in FIG. 6B With this arrangement, lower flanges 351b are deformed as shown in FIG. 10C and are thus further compressed in the Y-axis direction. On the other hand, recessed portions 315 are longer in the X-axis direction so that lower flanges 351b are not restricted in the X-axis direction. Therefore, in the state of FIG. 10A, lower flanges 351b extend in the X-axis direction and are not compressed in the X-axis direction.

Note that, FIG. 10C schematically shows a state in which lower flange 351b is compressed by walls 315a, and damper 351 actually has a shape having an undulation or expansion caused by compression in lower flange 351b or in a periphery of lower flange 351b.

Figure 11A:
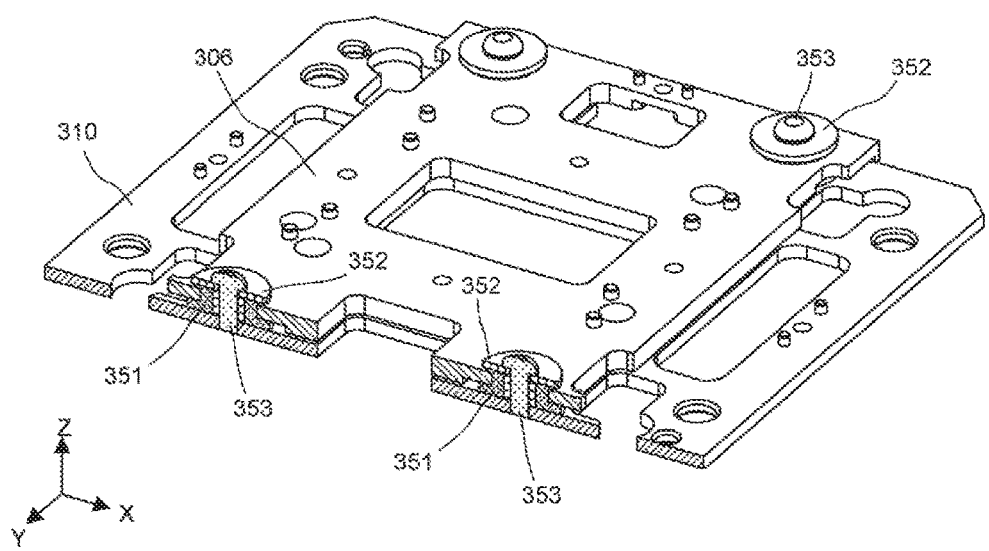
FIG. 11A is a perspective view including a cross-section of a structure according to the exemplary embodiment in which the support base is assembled on the fixed base.
Figure 11B:
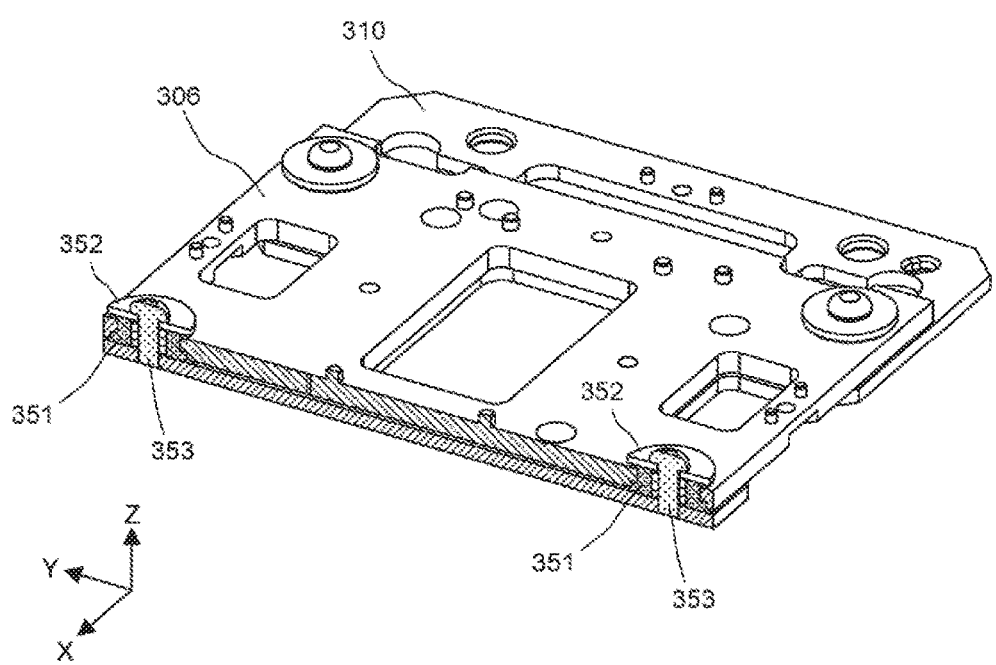
FIG. 11B is a perspective view including a cross-section of the structure according to the exemplary embodiment in which the support base is assembled on the fixed base.

FIG. 11A is a perspective view including a cross-section of the structure of FIG. 10A cut by a plane parallel to an X-Z plane passing through central positions of two dampers 351 on the positive side of the Y-axis, and FIG. 11B is a perspective view including a cross-section of the structure of FIG. 10A cut by a plane parallel to a Y-Z plane passing through central positions of two dampers 351 on the positive side of the X-axis.

Figure 12A:
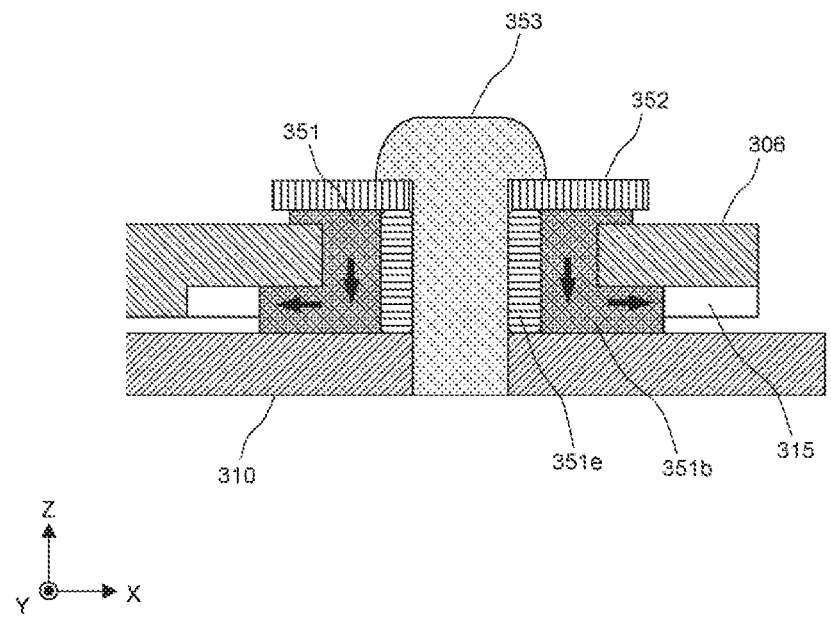
FIG. 12A is a cross-sectional view illustrating the vicinity of the damper according to the exemplary embodiment.
Figure 12B:
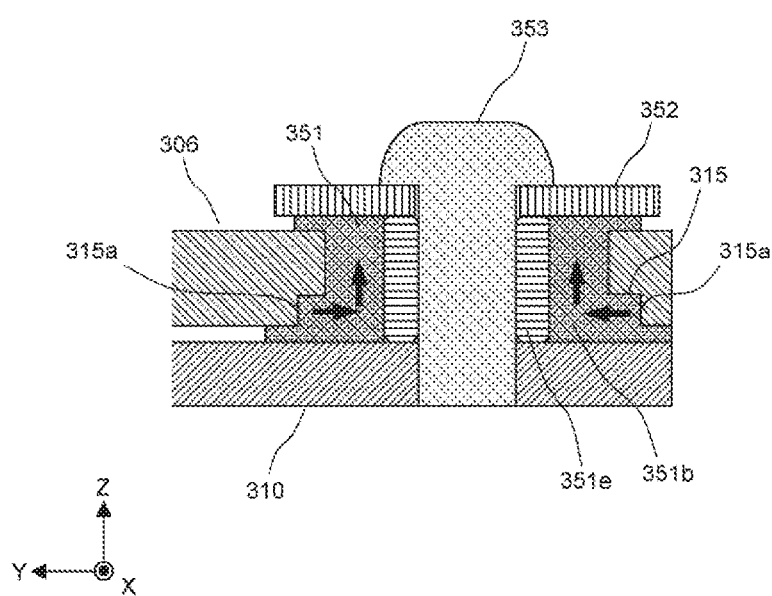
FIG. 12B is a cross-sectional view illustrating the vicinity of the damper according to the exemplary embodiment.

Further, FIG. 12A is an enlarged cross-sectional view, of the cross-section of FIG. 11A, in the vicinity of damper 351 on the positive side of the X-axis, and FIG. 12B is an enlarged cross-sectional view, of the cross-section of FIG. 11B, in the vicinity of damper 351 on the negative side of the Y-axis.

As shown in FIG. 12B, in a state in which bolt 353 is screwed in, lower flange 351b of damper 351 is compressed, in the Y-axis direction, being restricted by walls 315a of recessed portion 315 of the lower surface of support base 306. In contrast, lower flange 351b of damper 351 is not restricted in the X-axis direction as shown in FIG. 12A and is thus not compressed in the X-axis direction.

As described above, in a state in which support base 306 is attached to fixed base 310, dampers 351 are largely compressed in the Y-axis direction. With this arrangement, support base 306 is supported by fixed base 310 such that the support rigidity in the Y-axis direction is higher than the support rigidity in the X-axis direction. Here, the Y-axis direction is the direction (first direction) in which scanning lines L1 to Ln shown in FIG. 3B are arranged and in which the visual distance of the display image is changed along with the movement of screen 301. That is, support base 306 is supported by fixed base 310 such that the support rigidity is increased in the direction in which the visual distance of the display image is changed.

Since the support rigidity of support base 306 is adjusted as described above, if a high-speed reciprocate movement of screen 301 generates the vibration in drive unit 300 as described above, displacement of support base 306 is reduced or prevented which is caused by the vibration, in the Y-axis direction, in other words, in the direction in which the visual distance of the display image is changed. Thus, deterioration of the visibility of the display image is reduced or prevented.

Specifically, if the above vibration displaces support base 306 in the Y-axis direction, this displacement displaces screen 301 in the Y-axis direction. In this case, since screen 301 is inclined, a drawing height of k-th scanning line Lk is displaced on screen 301; thus, there occurs a change in the visual distance of the display image, in other words, a distance perspective which driver 2 feels based on a parallax between right and left eyes. This change creates a distortion in the display image which driver 2 visually recognizes, thereby resulting in making driver 2 feel discomfort.

In contrast, in the present exemplary embodiment, as described above, support base 306 is supported by fixed base 310 such that support rigidity is higher in the Y-axis direction, in other words, in the direction in which the visual distance of the display image is changed; therefore, displacement of support base 306 and screen 301 is reduced or prevented which is caused in the Y-axis direction by the vibration generated by the movement of screen 301. Thus, it is possible to reduce or prevent the change in the visual distance of the display image, thereby keeping the visibility of the display image preferable.

Note that, in the present exemplary embodiment, since the support rigidity of support base 306 is not increased in the X-axis direction as described above, screen 301 can be displaced in the X-axis direction by the above vibration. However, even if screen 301 is displaced in the X-axis direction, the drawing heights of scanning lines L1 to Ln scanned by laser light are not changed because the screen is not inclined in the X-axis direction. Therefore, there will be no change in the visual distance of the display image. In this case, the display image is visually recognized in the same state regardless of the displacement of screen 301 in the X-axis direction.

In addition, since the support rigidity of support base 306 is not increased in the X-axis direction as described above, damper 351 can exhibit an inherent damping action. In more detail, damper 351 is not compressed in the X-axis direction as described above; thus, damper 351 can properly exhibit an inherent viscous damping action despite being compressed in the Y-axis direction. Therefore, the above vibration can be properly absorbed in dampers 351. As a result, it is possible to surely reduce or prevent transmission of the vibration generated by the high-speed movement of screen 301 to fixed base 310.

Effects of Exemplary Embodiment

According to the above exemplary embodiment, the following effects are exerted.

The support base 306 is supported by fixed base 310 via dampers 351; thus, even if vibration is generated due to a high-speed movement of screen 301, the vibration is absorbed in dampers 351 before being transmitted to fixed base 310. Therefore, the vibration can be smoothly eliminated. Further, since the support rigidity of support base 306 with respect to fixed base 310 is increased in the direction in which the visual distance is changed, the displacement of screen 301 is reduced or prevented which is caused, in association with the vibration, in the direction in which the visual distance is changed. Thus, it is possible to reduce or prevent change in the visual distance of the display image in association with the vibration. As a result, it is possible to reduce or prevent deterioration of visibility of the display image.

As described with reference to FIGS. 10A to 10C and other drawings, dampers 351 are compressed in the direction in which the visual distance is changed, so that the support rigidity of dampers 351 is increased. Therefore, without specifically adding members for increasing the support rigidity or other members to dampers 351, it is possible to increase the support rigidity with respect to support base 306. Note that as shown in FIG. 10B, lower flange 351b has a volume larger than the volume of upper flange 351a; therefore, by compressing lower flange 351b as described above, the support rigidity of damper 351 can be effectively increased.

As shown in FIG. 10D, the pair of walls 315a are provided in the surface on the fixed base 310 side of support base 306, where the distance between the pair of walls 315a in the direction (Y-axis direction), in which the visual distance is changed, is smaller than the width of lower flange 351b of damper 351. Then, when fixed base 310 is made to support support base 306 via dampers 351, lower flange 351b of each damper 351 is pressed into a space between each pair of walls 315a. With this arrangement, dampers 351 are compressed in the direction (Y-axis direction) in which the visual distance is changed; thus, the support rigidity of dampers 351 in the direction is increased. With the above configuration, by the work of assembling support base 306 on fixed base 310 with bolts 353 as shown in FIG. 10A, lower flanges 351b of dampers 351 are compressed in the direction (Y-axis direction) in which the visual distance is changed, and the support rigidity of dampers 351 is increased in the direction. As a result, it is possible to assemble support base 306 and compress dampers 351 at the same time.

As shown in FIG. 10D, in a direction (the X-axis direction) other than the direction (Y-axis direction) in which the visual distance is changed, dampers 351 are not compressed and can expand. With this arrangement, even if dampers 351 are compressed in the Y-axis direction, dampers 351 can properly exhibit the viscous damping action. As a result, dampers 351 can surely absorb the vibration before the vibration is transmitted from support base 306 to fixed base 310

As shown in FIGS. 5A and 5B, position detection unit 400 is placed on fixed base 310 to detect the position of screen 301 in the optical axis direction. With this arrangement, even if the position of support base 306 on which a movable part is mounted changes in association with a vibration, position detection unit 400 detects the change in the position, and the change is corrected by a feedback control; thus, screen 301 can be kept at the right position. Therefore, position detection unit 400 can accurately detect the position of screen 301 in the Z-axis direction. It is noted that the optical axis direction is parallel to the Z-axis direction in this configuration.

As shown in FIGS. 5A and 5B, drive unit 300 is equipped with coil 331, and magnetic circuit 307 which applies a magnetic field to coil 331, where a current is supplied to coil 331 to generate electromagnetic force, and the electromagnetic force moves screen 301 in the optical axis direction. This arrangement can reciprocally move screen 301 in the Z-axis direction smoothly at a high speed.

In the above exemplary embodiment, the direction in which the visual distance is changed is the direction (Y-axis direction) in which scanning lines L1 to Ln are arranged. Since a visual distance is set to each of scanning lines L1 to Ln, image display processing can be performed smoothly.

Other Modification Examples

Although the exemplary embodiment of the present disclosure has been described above, the present disclosure is not limited to the exemplary embodiment described above, and moreover, a variety of modifications can be applied to application examples according to the present disclosure besides the exemplary embodiment described above.

For example, in the above exemplary embodiment, the support rigidity of support base 306 in the direction (Y-axis direction), in which the visual distance is changed, is increased by adjusting the compressed state of four dampers 351 of the same type in the same manner; however, the method of increasing the support rigidity of support base 306 is not limited to the above method. For example, in one configuration, dampers of three types may be provided respectively in the directions of the X-axis, Y-axis, and Z-axis such that each damper individually supports support base 306, where material for the damper corresponding to the Y-axis direction (the direction in which the visual distance is changed) is different from materials for the other dampers, so that the support rigidity in the Y-axis direction is increased.

Further, in the above embodiment, lower flanges 351b of dampers 351 are not restricted in the X-axis direction; however, lower flanges 351b of dampers 351 may be slightly restricted also in the X-axis direction while lower flanges 351b are being expanded. Further, it is also possible to increase the support rigidity in the Y-axis direction, in other words, in the direction in which the visual distance is changed, by compressing lower flanges 351b at different compression ratios between the X-axis direction and the Y-axis direction.

Further, in the above exemplary embodiment, screen 301 is placed on drive unit 300 to be slightly inclined with respect to the Z-axis; however, screen 301 may be placed on drive unit 300 to be perpendicular to the Z-axis.

Further, in the above exemplary embodiment, support base 306 and fixed base 310 have a plate-shaped configuration; however, support base 306 and fixed base 310 do not need to have a plate shape but, for example, may have a frame shape.

Moreover, the above-described exemplary embodiment illustrates an example where the present disclosure is applied to a head-up display mounted on vehicle 1; however, the present disclosure can be applied not only to on-vehicle use but also to other types of image display devices.

Moreover, the configurations of image display device 20 and irradiation light generator 21 are not limited to the configurations illustrated in FIG. 1C and FIG. 2, and are modifiable as appropriate. Further, the configuration of drive unit 300 to move screen 301 is not limited to the configuration described in the exemplary embodiment and can be modified as appropriate. For example, in one configuration, it is also possible to drive screen 301 by a piezoelectric drive unit or an electrostatic drive unit.

The exemplary embodiment of the present disclosure can be modified in various ways as appropriate within the scope of the technical idea disclosed in the claims.

What is claimed is:

1. An image display device comprising:
   a light source;
   a screen configured to be irradiated with light from the light source and on which an image is formed;
   a scanning unit configured to scan the light from the light source along a plurality of scanning lines on the screen, the plurality of scanning lines being parallel with each other and arranged in a direction perpendicular to one of the plurality of scanning lines;
   an optical system configured to form a virtual image, using the light from the screen;
   a drive unit configured to move the screen in an optical axis direction;
   a support base supporting the drive unit; and
   a fixed base supporting the support base via a damper, wherein:
   the support base and the fixed base are arranged along the optical axis direction,
   the support base is supported by the fixed base such that the support base has support rigidity higher in a first direction than in directions other than the first direction, the first direction being a direction in which a visual distance of a display image is changed in association with the movement of the screen, and
   the first direction is the direction in which the plurality of scanning lines are arranged.

2. The image display device according to claim 1, wherein support rigidity of the damper is configured to be increased by compressing the damper in the first direction.

3. The image display device according to claim 2, wherein:
   the support base includes a pair of walls on a surface of the support base, the surface facing the fixed base,
   a distance between the pair of walls in the first direction is smaller than a width of a part of the damper in the first direction, the part of the damper facing the fixed base, and
   when the support base is supported by the fixed base via the damper, the damper is compressed in the first direction so as to increase the support rigidity of the damper in the first direction by pressing the part of the damper into a space between the pair of walls, the part of the damper facing the fixed base.

4. The image display device according to claim 2, wherein the damper is not compressed and is expandable in the directions other than the first direction.

5. The image display device according to claim 1, wherein a position detection unit is placed on the fixed base to detect a position of the screen in the optical axis direction.

6. The image display device according to claim 1, wherein:
   the drive unit includes:
   a coil; and
   a magnetic circuit which is configured to apply a magnetic field to the coil, and
   the drive unit is configured to move the screen in the optical axis direction by electromagnetic force generated by applying a current to the coil.

* * * * *